United States Patent
Yang et al.

(10) Patent No.: US 11,855,786 B2
(45) Date of Patent: *Dec. 26, 2023

(54) SYSTEMS AND METHODS FOR INTELLIGENT DIFFERENTIATED RETRANSMISSIONS

(71) Applicant: Verizon Patent and Licensing Inc., Basking Ridge, NJ (US)

(72) Inventors: Jin Yang, Orinda, CA (US); Richard Hornby, Mountain Lakes, NJ (US); Krishna K. Bellamkonda, Flower Mound, TX (US); Ahmed Moussa, Montclair, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/166,650

(22) Filed: Feb. 9, 2023

(65) Prior Publication Data

US 2023/0188273 A1   Jun. 15, 2023

Related U.S. Application Data

(63) Continuation of application No. 17/358,124, filed on Jun. 25, 2021, now Pat. No. 11,601,230.

(51) Int. Cl.
*H04L 1/1867* (2023.01)
*H04L 1/1812* (2023.01)
*H04W 28/24* (2009.01)
*H04W 80/02* (2009.01)
*H04L 1/1829* (2023.01)

(52) U.S. Cl.
CPC ............ *H04L 1/189* (2013.01); *H04L 1/1819* (2013.01); *H04W 28/24* (2013.01); *H04W 80/02* (2013.01)

(58) Field of Classification Search
CPC ..... H04L 1/189; H04L 1/1819; H04L 1/1864; H04W 28/24; H04W 80/02
See application file for complete search history.

(56) References Cited

U.S. PATENT DOCUMENTS

| | | | |
|---|---|---|---|
| 11,601,230 B2 * | 3/2023 | Yang | H04W 28/24 |
| 2017/0094016 A1 | 3/2017 | Chen et al. | |
| 2018/0249486 A1 | 8/2018 | Hosseini et al. | |
| 2019/0182369 A1 | 6/2019 | Gauvin et al. | |
| 2019/0274153 A1 * | 9/2019 | Park | H04L 5/0044 |
| 2019/0341992 A1 | 11/2019 | Zhou et al. | |
| 2020/0053546 A1 | 2/2020 | Panchal et al. | |
| 2020/0154427 A1 * | 5/2020 | Choi | H04W 72/21 |
| 2021/0045073 A1 | 2/2021 | Joo et al. | |
| 2021/0076269 A1 * | 3/2021 | Awoniyi-Oteri | H04B 7/022 |
| 2022/0060935 A1 | 2/2022 | Li et al. | |

* cited by examiner

*Primary Examiner* — Harry H Kim

(57) ABSTRACT

Systems and methods described herein provide for intelligent differentiated retransmissions in Radio Access Networks (RANs), such as Fifth Generation New Radio (5G-NR) networks, to provide consistent low latency for different service requirements. A network device determines if consistent low latency is required for a communication session requested by a user equipment (UE) device. The network device selects, based on the determining, retransmission settings for the communication session and sends the retransmission settings to an access station of a radio access network (RAN).

20 Claims, 8 Drawing Sheets

SYSTEMS AND METHODS FOR INTELLIGENT DIFFERENTIATED RETRANSMISSIONS

CROSS-REFERENCE TO RELATED APPLICATION

This application is a continuation of U.S. patent application Ser. No. 17/358,124, filed on Jun. 25, 2021, and titled "Systems and Methods for Intelligent Differentiated Retransmissions," the contents of which are incorporated herein by reference.

BACKGROUND

Next generation wireless networks (e.g., Fifth Generation (5G) networks) are intended to provide various services and applications to user devices with optimized latency and quality of service. For example, the use of Multi-access Edge Computing (MEC) platforms with 5G networks allows high network computing loads to be transferred onto edge servers, which can minimize latency and reduce backhaul delay.

DETAILED DESCRIPTION OF EXAMPLE EMBODIMENTS

Figure 1:
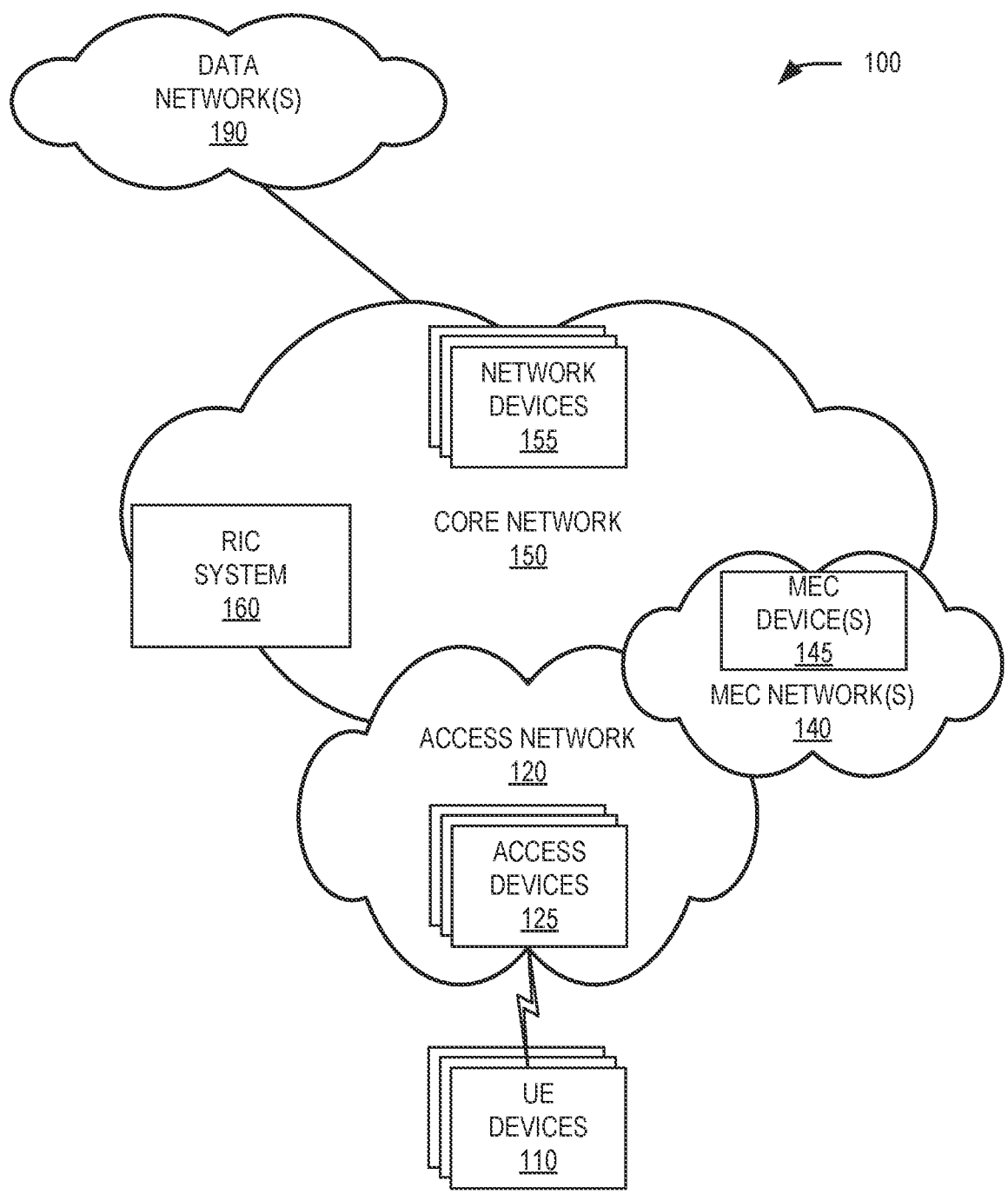
FIGS. 1 and 2 are diagrams illustrating a network environment according to an implementation described herein.

The following detailed description refers to the accompanying drawings. The same reference numbers in different drawings may identify the same or similar elements.

Systems and methods described herein provide for intelligent differentiated retransmissions in Radio Access Networks (RANs), such as Fifth Generation New Radio (5G-NR) networks, to provide consistent low latency for different service requirements. The ability to provide consistent low latency is essential for implementation and expansion of innovative 5G applications. 5G-NR networks are typically optimized for best effort data services, and error controls, such as retransmissions, are minimized to allow for maximal data rate and lowest latency.

Error control methods in wireless communication may include the use of repeat requests. If a sending device does not receive acknowledgement of successful receipt of a transmission from a receiving device before a timer expires, the sender may re-transmit a data unit (e.g., a frame, a packet, a resource block, etc.) a predefined number of times until an acknowledgement of successful receipt of a transmission is received. A type of automatic repeat request (ARQ) process used in wireless communication is a hybrid ARQ (HARQ). In HARQ, forward error correction (FEC) is used in combination with ARQ for error control. Thus, in HARQ, the data to be transmitted is encoded with a FEC code.

In a wireless communication network, a HARQ number may be set to indicate the allowed maximum number of HARQ transmissions. Increasing the maximum number of HARQ transmissions can provide an increase in coverage, as user equipment (UE) devices further away from an access station (or base station) may be able to successfully send data while experiencing poor radio frequency (RF) conditions when allowed more retransmission attempts. However, increasing the allowed maximum number of HARQ transmissions increases latency, as a higher number of retransmission attempts may delay the time it takes a signal to traverse a path from a sender UE device to a receiver UE device.

5G-NR networks also allow for slot aggregation. Slot aggregation refers to transmissions that span two or more slots to achieve improved coverage and/or reduced overhead. In contrast with previous network standards, slot aggregation allows control information (e.g., a Physical Downlink Control Channel or PDCCH) in one slot (e.g., a time transmission interval) to allocate multiple slots to a UE device. The UE device can read the PDCCH and determine that the PDCCH has assigned multiple slots for the UE device, including the first slot. Slot aggregation can increase the capacity and spectral efficiency of the radio network. However, slot aggregation can also increase latency under certain retransmission conditions.

Communication channels in 5G-NR networks include multiple network layers, such as a Packet Data Convergence Protocol (PDCP) layer, a Radio Link Control (RLC) layer, a Media Access Control (MAC) layer, and a physical layer. UE retransmission or aggregation in 5G-NR networks can be performed at lower physical/MAC layers as well as higher PDCP layers. Any packet drop at a lower layer could trigger a much larger retransmission on the higher layers and introduce higher latency (e.g., larger than about 100 ms).

Therefore, a network may set a relatively conservative HARQ number with minimal aggregation to ensure a sufficiently low latency for certain types of applications or use cases. Conversely, higher HARQ numbers with more aggregation maybe preferred to ensure better coverage and/or higher bandwidth for other types of applications or use cases where higher latencies can be tolerated.

According to implementations described herein, an intelligent differentiated retransmission scheme may be implemented to provide consistent low latency in 5G-NR networks. A RAN intelligent controller may allocate a maximal lower physical layer retransmission to avoid upper layer retransmission. The RAN intelligent controller may also intelligently adjust lower layer slot-aggregation, as well as upper layer PDCP aggregation. The retransmission scheme may be differentiated for varieties of services based on user, flow, quality of service (QoS) requirements, and/or network slicing identifications. The retransmission scheme and thresholds may be further differentiated based on user traffic pattern and latency requirements. Thus, in one aspect, consistent low latency may be considered the ability to maintain connection delays below a pre-determined threshold (e.g., 30 milliseconds (ms) round-trip delay time (RTT), 50 ms RTT, 100 ms RTT, etc.) for an application at a given service level (e.g., 99.9%, 99.99%, etc.). The RAN intelligent controller may be able to optimize the retransmission scheme and radio resource allocation to support consistent low latency requirements.

FIG. 1 is a diagram of an exemplary environment 100 in which the systems and/or methods, described herein, may be implemented. As shown in FIG. 1, environment 100 may include user equipment (UE) devices 110, an access network 120 that includes access devices 125, multi-access edge computing (MEC) network(s) 140 that include MEC device(s) 145, a core network 150 that includes network device(s) 155 and a RAN Intelligent Controller (RIC) system 160, and data networks 190.

UE device 110 may include a device with cellular wireless communication functionality. For example, UE device 110 may include a handheld wireless communication device (e.g., a smart phone, etc.), a wearable computer device (e.g., a wristwatch computer device, etc.), a computer; a WiFi access point, a portable gaming system, an Internet-of-Things device, a fixed wireless access device, and/or any other type of computer device with wireless communication capabilities. UE device 110 may send packets to or over access network 120. UE device 110 may include/execute one or more applications. In some instances, these applications may have low-latency requirements for communications with, for example, MEC devices 145 or data network 190. In other instances, these applications may have higher latency thresholds. The latency requirements for an application may correspond to a particular user, flow, QoS and/or network slice associated with UE device 110.

Access network 120 may include a RAN that enables UE devices 110 to connect to core network 150 via access devices 125 using wireless signals. For example, access network 120 may include one or more central units (CUs) and distributed units (DUs) (not shown in FIG. 1) that enable and manage connections from access device 125 to core network 150. Access network 120 may include features associated with an LTE Advanced (LTE-A) network and/or a 5G core network or other advanced network, such as management of 5G New Radio (NR) base stations; carrier aggregation; advanced or massive multiple-input and multiple-output (MIMO) configurations (e.g., an 8×8 antenna configuration, a 16×16 antenna configuration, etc.); relay stations; Heterogeneous Networks (HetNets) of overlapping small cells and macrocells; Self-Organizing Network (SON) functionality; Machine-type Communications (MTC) functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Access device 125 may include a 5G NR base station (e.g., a gNodeB) and/or a Fourth Generation (4G) Long Term Evolution (LTE) base station (e.g., an eNodeB). Each access device 125 may include devices and/or components configured to enable wireless communication with UE devices 110. For example, access device 125 may include a radio frequency (RF) transceiver configured to communicate with UE devices using a 5G NR air interface using a 5G NR protocol stack, a 4G LTE air interface using a 4G LTE protocol stack, and/or using another type of cellular air interface. Access device 125 may enable communication with core network 150 to enable core network 150 to authenticate UE device 110. Access device 125 is described further in connection with FIG. 2.

Each MEC network 140 may be associated with one or more access devices 125 and may provide MEC services for UE devices 110 attached to the one or more access devices 125. MEC network 140 may be in proximity to the one or more access devices 125 from a geographic and network topology perspective, thus enabling low latency communication with UE devices 110 and/or access devices 125. As an example, MEC network 140 may be located on a same site as one of the one or more access devices 125. As another example, MEC network 140 may be geographically closer to the one or more access devices 125, and reachable via fewer network hops and/or fewer switches, than other access devices 125 and/or data networks 190.

MEC network 140 may include one or more MEC devices 145 that may provide MEC services to UE devices 110, such as, for example, content delivery of streaming audio and/or video, cloud computing services, authentication services, etc. In some implementations, MEC devices 145 may host deployed virtual network functions (VNFs) used to implement particular network slices. Thus, MEC devices 145 may form part of an infrastructure for hosting network slices.

Core network 150 may be managed by a provider of cellular wireless communication services and may manage communication sessions of subscribers connecting to core network 150 via access network 120. For example, core network 150 may establish an Internet Protocol (IP) connection between UE devices 110 and data network 190. In some implementations, core network 150 may include a 5G core network. A 5G core network may perform registration management, connection management, reachability management, mobility management, lawful intercepts, session management, session modification, session release, IP allocation and management, Dynamic Host Configuration Protocol (DHCP) functions, etc. In other implementations, core network 150 may also include a 4G LTE core network components (e.g., an evolved packet core (EPC) network).

Core network 150 may include network device(s) 155. Network device 155 may include a 5G network function; a 4G network node; a transport network device, such as, for example, a switch, router, firewall, gateway, an optical switching device (e.g., a reconfigurable optical add-drop multiplexer, etc.), and/or another type of network device. For example, network devices 155 may include a user plane function (UPF), an access and management mobility function (AMF), a session management function (SMF), a unified data management (UDM) device, a unified data repository (UDR) device, an authentication server function (AUSF), a Network Slice Selection Function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, network devices 155 may include additional, different, and/or fewer network devices than those described. For example, network devices 155 may include a non-standard or a proprietary network device, and/or another type of network device that may be well-known but not particularly mentioned herein.

Network devices 155 may also include a network device that provides a multi-RAT functionality (e.g., 4G and 5G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Network device 155 may include a physical function node or a VNF. Thus, the components of core network 150 may be implemented as dedicated hardware components and/or as VNFs implemented on top of a common shared physical infrastructure using software defined networking. Core network 150 may also be referred to herein as a transport network.

RIC system 160 may use artificial intelligence (AI)-enabled policies and machine learning (ML)-based models to optimize network performance. RIC system 160 may include a near-real time RIC and a non-real time RIC. The near-real time RIC and a non-real time RIC may be implemented as functional layers of a single component (e.g., a single RIC device) or as separate components. For example, a non-real time RIC may be included in an orchestration layer of a network management system, while a near-real time RIC may be included within an access device 125.

The control functionality of the non-real-time RIC relates to greater than about 1 second (>1s) timeframe and the control functionality of the near real-time RIC relates to less than about 1 second (<1s) timeframe. Messages generated from AI-enabled policies and ML-based models of the non-real-time RIC may be communicated to the near-real-time RIC. The near-real time RIC may dynamically apply RAN resources to UE devices to optimize services/resource. RIC system 160 may include interfaces that provide communication with access devices 125 of access network 120, as described herein. As described further herein, RIC system 160 may provide an intelligent differentiated retransmission scheme.

Data network 190 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Data network 190 may be associated with an Access Point Name (APN) and UE device 110 may request a connection to the particular data network 190 using the APN.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
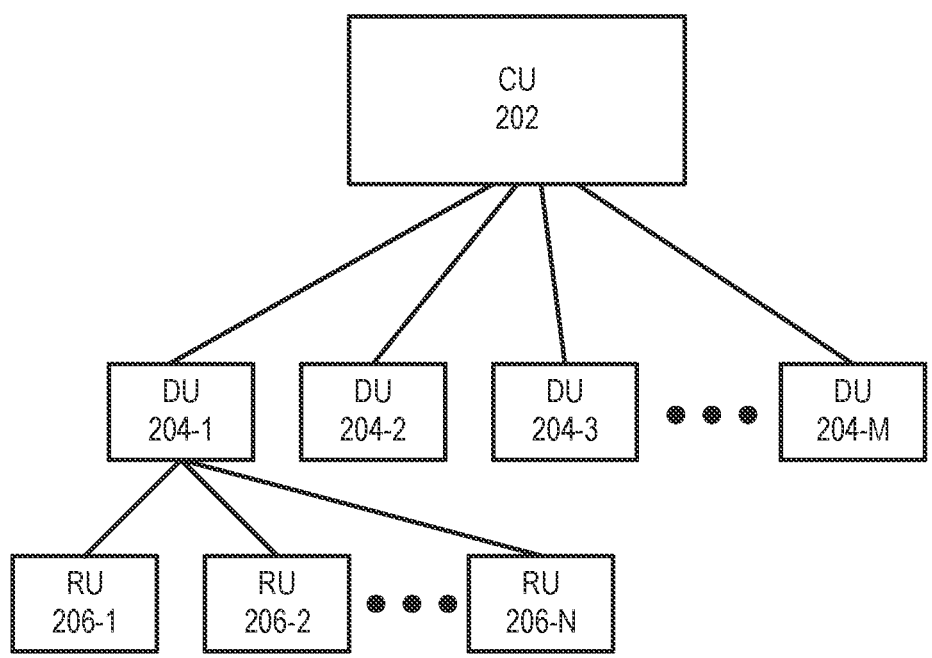

FIG. 2 is a diagram illustrating a configuration of access devices 125 in access network 120 consistent with environment 100, as described herein. As illustrated, access network 120 may include elements of a disaggregated RAN. The communication links and interfaces illustrated and described are exemplary in terms of number, connectivity, and type. The interfaces may be implemented as reference point-based or service-based. Each of access station 125 includes a central unit (CU) 202, distributed units (DUs) 204-1 through 204-M, and, for each DU 204, one or more Radio Units (RUs) 206-1 through 206-N. RU 206 may also be referred to as a remote radio head (RRH). For simplicity, other RUs are not shown in FIG. 2.

CUs 202 may control DUs 204 over a front haul interface. CUs 202 may manage, for example, sharing access network 120, conveying user data, mobility, sessions, etc. For each CU 202, there may be multiple DUs 204 controlled by the CU 202. CU 202 may process upper layers of the communication protocol stack for access stations 125. CUs 202 may not necessarily be physically located near DUs 204, and may be implemented as cloud computing elements, through network function virtualization (NFV) capabilities of the cloud. In one implementation, CU 202 communicates with components of core network 150 through S1/NG interfaces and with other CUs 202 through X2/Xn interfaces.

DUs 204 may be controlled by CU 202. Each DU 204 in access network 120 may be controlled by one CU 202. However, each DU 204 may send signals to multiple RUs 206 for transmission. DUs 204 may handle UE device mobility, from DU to DU, from an access station 125 to another access station 125, from a cell to another cell, from a beam to another beam, etc. DUs 204 communicate with a CU 202 through an F1 interface, and may process lower layers of a communication protocol stack for wireless station 110.

RU 206 may provide radio frequency (RF) functionality to establish wireless channels with UE devices 110. RUs 206 may control beam shape, beam strength, and beam directions to balance traffic load over different bands. RU 206 may be embodied in different form factors having different sizes and various capabilities.

Figure 3:
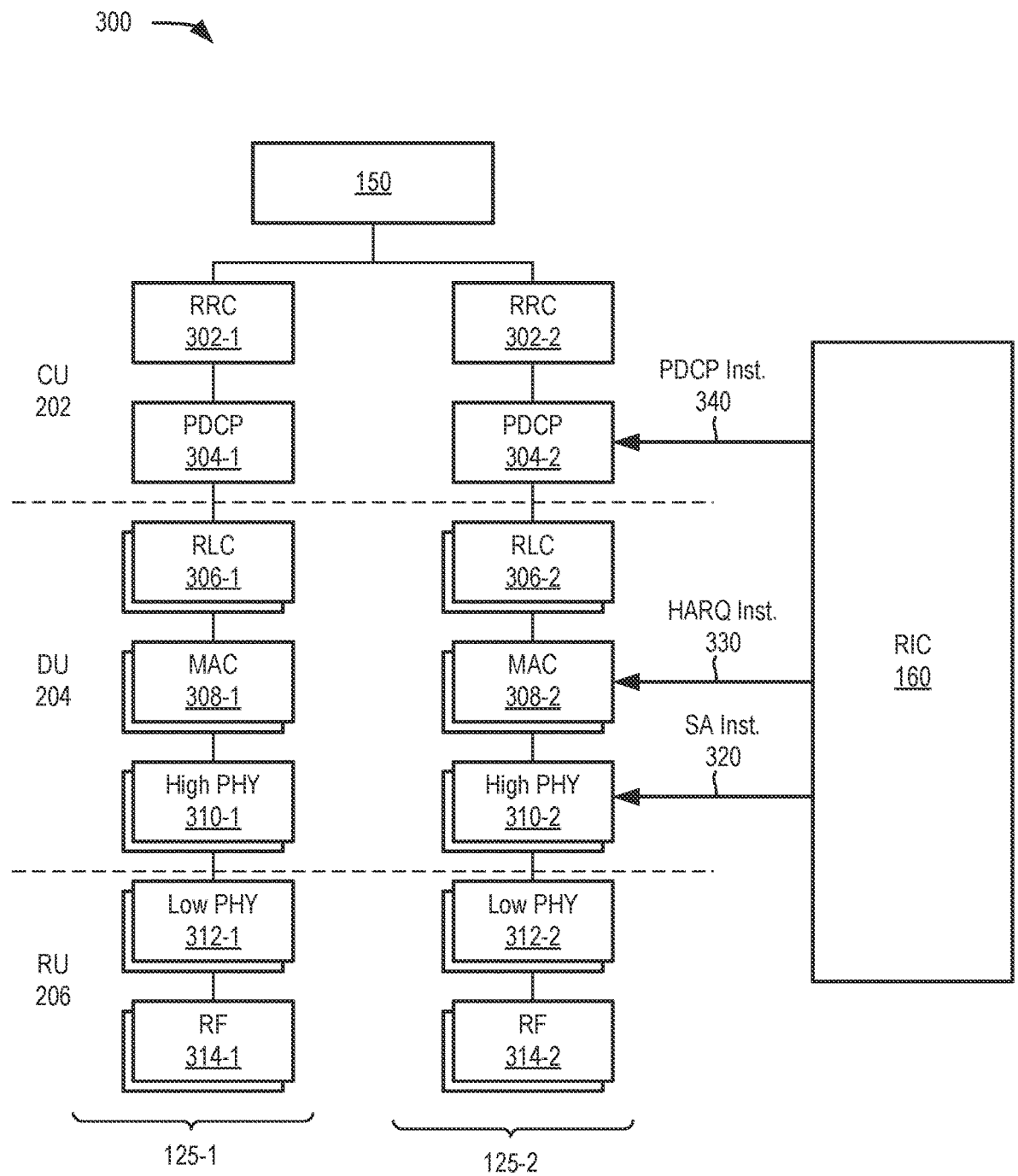
FIG. 3 is a diagram illustrating controlled layers a retransmission framework, according to an implementation.

FIG. 3 is a diagram illustrating controlled layers for a retransmission framework in a portion 300 of network environment 100. As illustrated in FIG. 3, two access devices 125-1 and 125-2 include layers of RAN 120 corresponding to CU 202, DU 204, and RU 206. Access devices 125-1 and 125-2 may operate individually to provide a single link for a UE device 110. Alternatively, devices 125-1 and 125-2 may operate using dual connectivity or carrier aggregation to provide multiple links for a UE device 110.

CU 202 may include protocol layers comprising a Radio Resource Control (RRC) layer 302 and a PDCP layer 304. Radio resource control (RRC) layer 302 may handle control plane signaling between UE device 110 and access network 120. RRC states (e.g., "idle mode," "connected mode," etc.) may be handled, for example, at a control plane which includes an RRC layer. When Dual Connectivity is used in 5G networks, UE device 110 may connect to two different access devices 125 and send/receive data via different data streams. PDCP layer 304 may be responsible for processing/aggregating the split data streams. PDCP aggregation may be performed at CU 202 (e.g., rather than an anchoring DU) where pooling/resource sharing can efficiently handle the aggregation task.

DU 204 may include protocol layers comprising a Radio Link Control (RLC) layer 306 (RLC 306-1 and 306-2), a Media Access Control (MAC) layer 308 (MAC 308-1 and MAC 308-2), and a high Physical (PHY) layer 310 (high PHY 310-1 and high PHY 310-2). RLC 306 receives upper layer protocol data units (PDUs), groups them for different transport channels, and transfers them to peer RLC 306 over lower layers. MAC 308 maps the RLC 306 to physical layer data/signals. MAC 308 multiplexes and de-multiplexes logical channels, prioritizes the channels, handles hybrid automatic repeat request, and deals with random access control. In addition, MAC 308 manages the data as MAC PDUs, and schedules them for transmission over high PHY 310. The result of scheduling has the effect of pre-committing, at high PHY 310, blocks of frequency ranges and time intervals to be used for transmission of particular signals/data. These blocks of frequency-ranges and time intervals are herein referred to as physical resource bocks (PRBs). That is, scheduling reserves specific PRBs for particular transmissions at specified times. PRBs are components of what is referred to as radio frames.

RU 206 may include protocol layers comprising a low PHY layer 312 and RF layer 314. Low PHY layer 312 may receive signals from DU 206, process them, and send them to antenna elements of RF layer 314 for transmission. RF layer 314 may receive the signals and radiate the signals as beams that provide a coverage area for wireless service.

As further shown in FIG. 3, RIC system 160 may provide instructions for retransmission and aggregation to different layers of access stations 125. The retransmission scheme may be differentiated for varieties of services based on user, flow, QoS, and network slicing identifications. The retransmission scheme and thresholds are further differentiated based on user traffic pattern and latency requirement. RIC system 160 may optimize the retransmission scheme and radio resource allocation to support consistent low latency.

MC system 160 may provide instructions to different layers of RAN 120 to implement the differentiated retransmission scheme according to user data rate and latency requirements. RIC system 160 may provide slot aggregation (SA) instructions 320 to high PHY layer 310 and HARQ instructions 330 to MAC layer 308. SA instructions 320 may be differentiated for each network slice/QoS and/or a user group (e.g., users having common demographics, of the same locale, etc.). HARQ instructions 330 may provide a maximal HARQ value for each network slice/QoS and/or user group. RIC system 160 may adjust the maximal HARQ based on historical data for a device (e.g., UE device 110) location. RIC system 160 may also adjust the maximal HARQ per cell per frequency band or carriers. RIC system 160 may provide PDCP instructions 340 to PDCP layer 304. The trigger for levels of PDCP aggregation may be adjustable based on user data rate and latency requirement.

Figure 4:
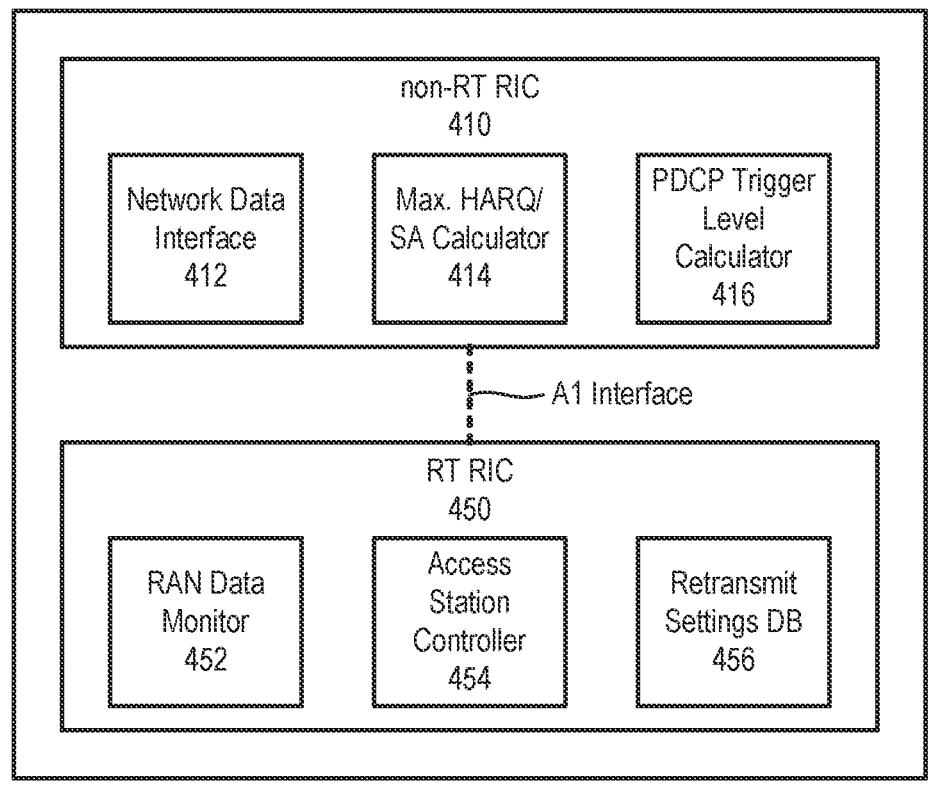
FIG. 4 is a diagram illustrating example logical components of a RAN intelligent controller, according to an implementation.

FIG. 4 is a block diagram illustrating example logical components of RIC system 160 that implements intelligent differentiated retransmissions. As shown in FIG. 4, RIC system 160 may include a non-real time RIC (non-RT RIC) 410 and a real-time RIC (RT RIC) 450.

Non-RT RIC 410 may provide service and policy management, RAN analytics, and model-training for RT RIC 450. Non-RT RIC 410 may produce trained models and real-time control functions, which may be distributed to RIC-near-RT 225 for runtime execution. As shown in FIG. 4, non-RT RIC 410 may include a network data interface 412, a maximal HARQ/SA calculator 414, and a PDCP trigger level calculator 416.

Network data interface 412 may obtain network data, such as data from access network 120, MEC network, and core network 150, that can be used to determine the maximal HARQ and slot aggregation values for different data rate and latency requirements. For example, network data interface 412 may communicate with a self-organizing network (SON), a service orchestrator, and/or a network data analytics function (NWDAF) to obtain network data. In another implementation, network data interface 412 may communicate with MEC network 140 to obtain projected load levels and/or expected latency to support network slices.

Maximal HARQ/SA calculator 414 may use data collected from network data interface 412 to determine a maximal HARQ (and/or a different type of repeat requests setting) based on historical data for a UE device location. A different maximal HARQ may be assigned to different network slices, QoS levels, and/or user groups. For example, a network slice ID may be associated with a particular required bandwidth and latency, among other settings. Maximal HARQ/SA calculator 414 may determine a maximal HARQ value to meet the bandwidth and latency requirements without triggering PDCP aggregation (which may adversely impact consistent latency). Additionally, maximal HARQ/SA calculator 414 may adjust maximal HARQ values per cell, per frequency band, or carrier. According to an implementation, maximal HARQ/SA calculator 414 may also determine a maximal slot aggregation for the different network slices, QoS levels, and/or user groups. According to an implementation, maximal HARQ/SA calculator 414 may provide calculated maximal HARQ values for different network slices, QoS levels, and/or user groups to a retransmit settings database 456, which may be stored at RT RIC 450 (as shown in FIG. 4) and/or with non-RT RIC 410.

PDCP trigger level calculator 416 may use data collected from network data interface 412 to determine trigger levels to invoke PDCP aggregation. For example, PDCP trigger level calculator 416 may assign a trigger level for a latency service requirement, such as a bound that must be maintained in order for the service requirement to not be in danger of being violated. As an example, if the minimum required throughput for a streaming video application is 5 Mbps, a bound of 6 Mbps may be set as the trigger level at which a SON action is triggered. PDCP trigger levels could also be based on packet data size (e.g., 1300 bytes), radio conditions (e.g., −100 dBm) and radio node data buffer sizes. According to an implementation, maximal HARQ/SA calculator 414 may provide calculated trigger levels for PDCP aggregation to retransmit settings database 456, which may be stored at RT RIC 450 (as shown in FIG. 4) and/or with non-RT RIC 410.

RT RIC 450 may operate at real-time or near-real-time response times (e.g., response times under one second) to provide control functionality and interfaces with CU 202 and/or DU 204 in access network 120. As illustrated in FIG. 4, RT RIC 450 may include a RAN data monitor 452, an access station controller 454, and retransmit setting DB 456.

RAN data monitor 452 may collect local RAN data from accesses stations 125, such as up-to-date radio resource data and recent slice/AMF assignment data observed in portions of access network 120. In another implementation, RAN data monitor 452 may collect real-time connection status, such as particular access stations and/or MEC devices 145 available to a UE device 110. Thus, RAN data monitor 452 may provide contextual awareness of accesses stations 125 and traffic sourcing which is affected by the availability or absence of MEC network 140. In case of inter-site mobility (e.g., between different access stations 125) for slices (such as autonomous vehicles, drones and such), RAN data monitor 452 may obtain load awareness, capacity, and/or current latency at the neighboring accesses stations 125.

Access station controller 454 may assign a HARQ setting (and/or a different type of repeat request setting) for a particular communication session or a type of communication session requested by a UE device 110. For example, access station controller 454 may determine a latency requirement for a service type associated with the communication session and may select a maximal HARQ setting and/or SA setting (e.g., from retransmit setting DB 456) based on the determined latency requirement. According to an implementation, access station controller 454 may determine whether the communication session is able to be serviced by a MEC device 145 (e.g., at a network edge) and confirm the MEC device 145 has adequate capacity. For example, if service for a particular slice is available at a MEC device 145, then the retransmission modes (HARQ and/or PDCP) may be altered to suit the needs of the slice consumers (UE devices 110) at an accesses station 125. Access station controller 454 may provide the maximal HARQ setting and/or SA setting to access station 125, which may provide the settings to UE device 110. According to another implementation, access station controller 454 may monitor slice mobility between access stations 125 and transfer (or enable access stations 125 to transfer) a state of HARQ retransmissions from one access station 125 to another.

Retransmit settings database 456 may store calculated maximal HARQ values for different network slices, QoS levels, and/or user groups to ensure consistent low-latency. In one implementation, retransmit settings database 456 may include settings for a local CU 202. In another implementation, retransmit settings database 456 may include settings for multiple CUs 202. Additionally, in some aspects, retransmit settings database 456 may also include MEC connectivity status and other HARQ or PDCP states for CU 202 and/or DUs 204.

Although FIG. 4 illustrates certain logical components of RIC system 160, in other implementations, RIC system 160 may include fewer, different, or additional logical components than depicted in FIG. 4. Additionally or alternatively, one or more logical components of RIC system 160 may perform functions described as being performed by one or more other logical components.

Figure 5:
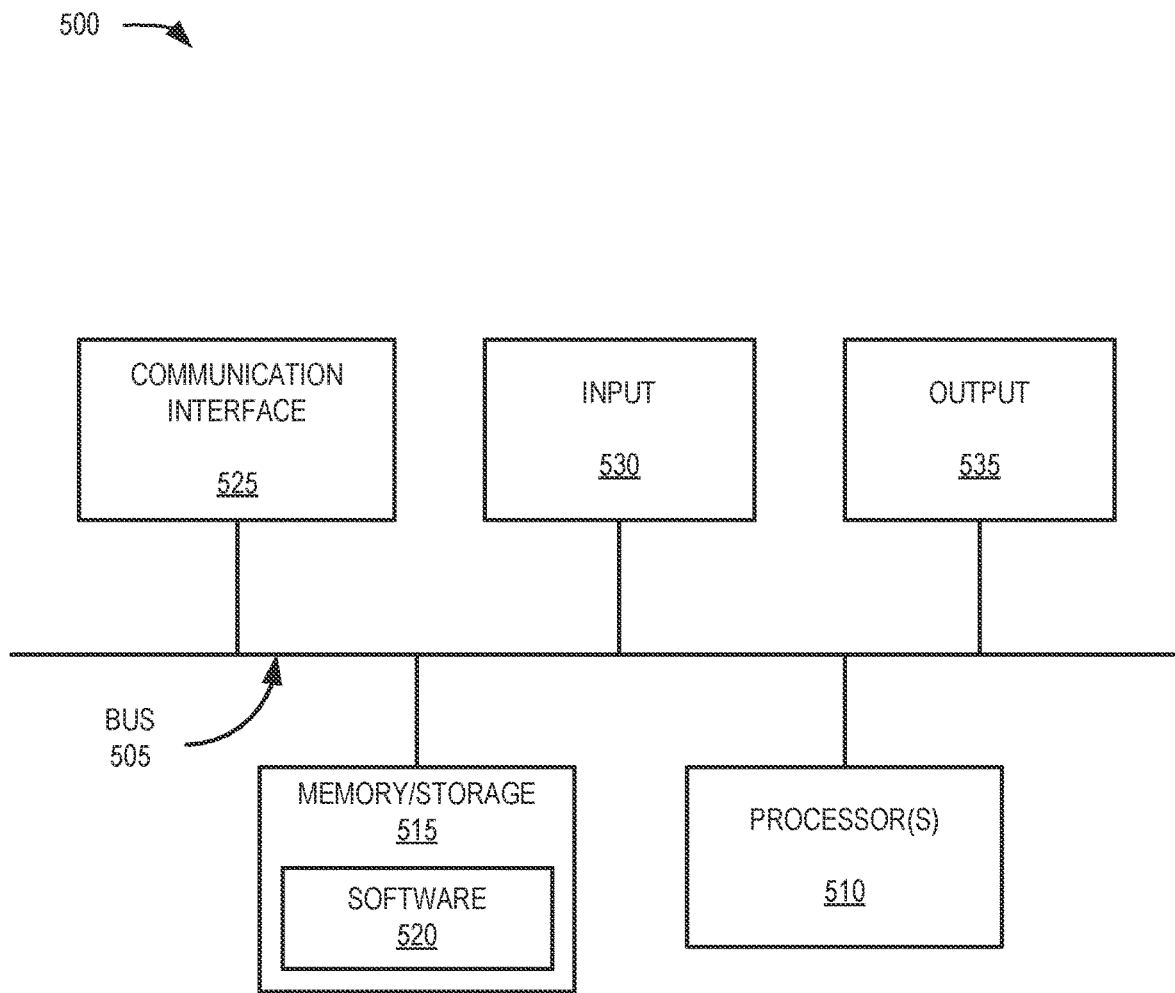
FIG. 5 is a diagram illustrating an example device for implementing an intelligent differentiated retransmission scheme, according to an implementation.

FIG. 5 is a diagram illustrating exemplary components of a device 500 that may correspond to one or more of the devices described herein. For example, device 500 may correspond to components included in UE device 110, access devices 125, MEC devices 145, network devices 155, RIC system 160, and other devices illustrated in FIGS. 2-4. As illustrated in FIG. 5, according to an exemplary embodiment, device 500 includes a bus 505, processor 510, memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, and/or clocks.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc. Processor 510 may be a dedicated component or a non-dedicated component (e.g., a shared resource).

Processor 510 may control the overall operation or a portion of operations performed by device 500. Processor 510 may perform operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include a drive for reading from and writing to the storage medium.

Memory/storage 515 may be external to and/or removable from device 500, such as, for example, a Universal Serial Bus (USB) memory stick, a dongle, a hard disk, mass storage, off-line storage, network attached storage, or some other type of storage medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. Software 520 may include an operating system. Software 520 is also intended to include firmware, middleware, microcode, hardware description language (HDL), and/or other forms of instruction. For example, according to an implementation, software 520 may implement portions of logical components of FIG. 4.

Communication interface 525 permits device 500 to communicate with other devices, networks, systems, devices, and/or the like. Communication interface 525 includes one or multiple wireless interfaces and/or wired interfaces. For example, communication interface 525 may include one or multiple transmitters and receivers, or transceivers. Communication interface 525 may include one or more antennas. For example, communication interface 525 may include an array of antennas. Communication interface 525 may operate according to a protocol stack and a communication standard. Communication interface 525 may include various processing logic or circuitry (e.g., multiplexing/de-multiplexing, filtering, amplifying, converting, error correction, etc.).

Input 530 permits an input into device 500. For example, input 530 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 535 permits an output from device 500. For example, output 535 may include a speaker, a display, a light, an output port, and/or some other type of visual, auditory, tactile, etc., output component. According to some embodiments, input 530 and/or output 535 may be a device that is attachable to and removable from device 500.

Device 500 may perform a process and/or a function, as described herein, in response to processor 510 executing software 520 in a computer-readable medium, such as memory/storage 515. A computer-readable medium may be defined as a non-transitory memory device. A memory device may be implemented within a single physical memory device or spread across multiple physical memory devices. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6A:
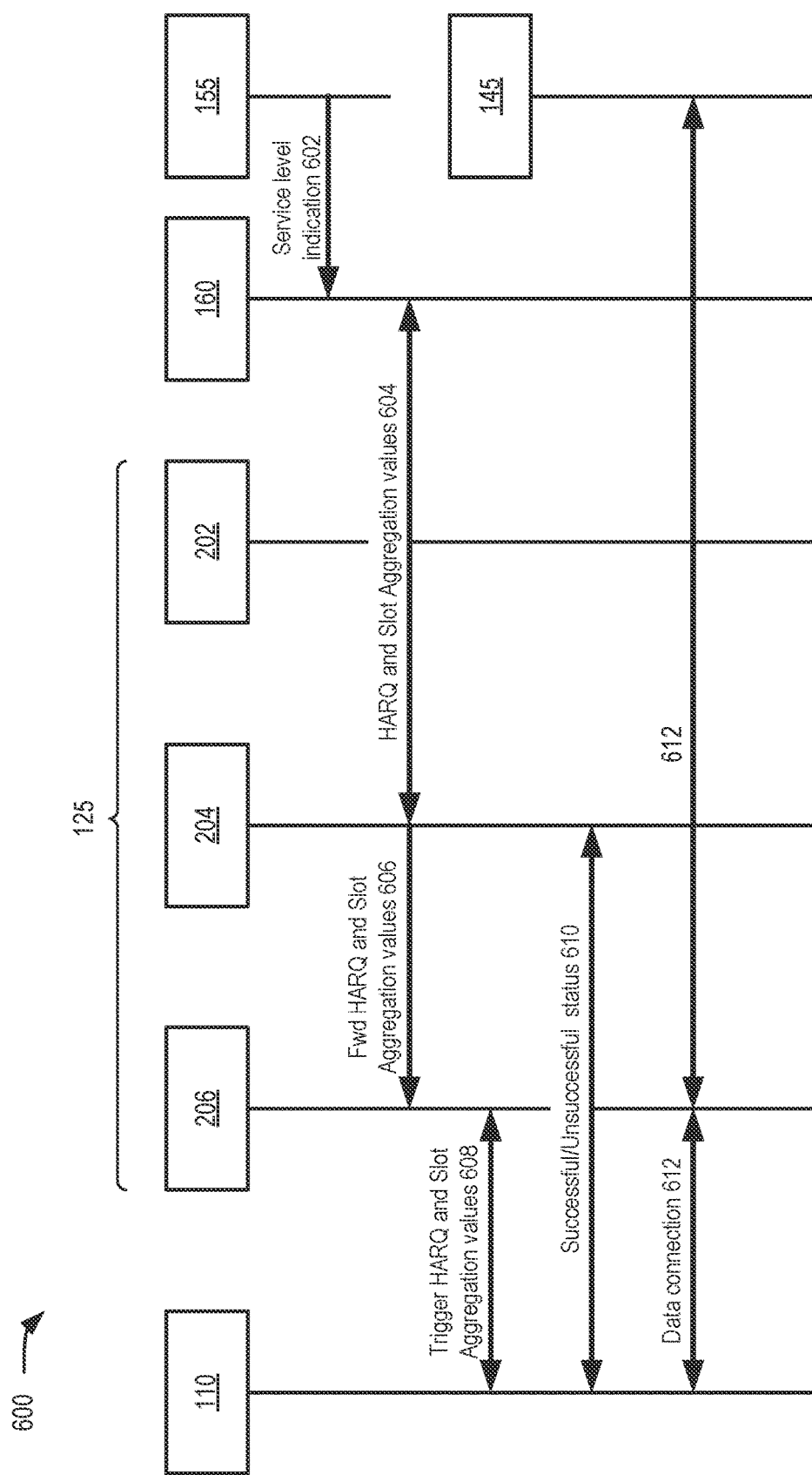
FIGS. 6A and 6B are diagrams illustrating example communications to implement an intelligent differentiated retransmission scheme.
Figure 6B:
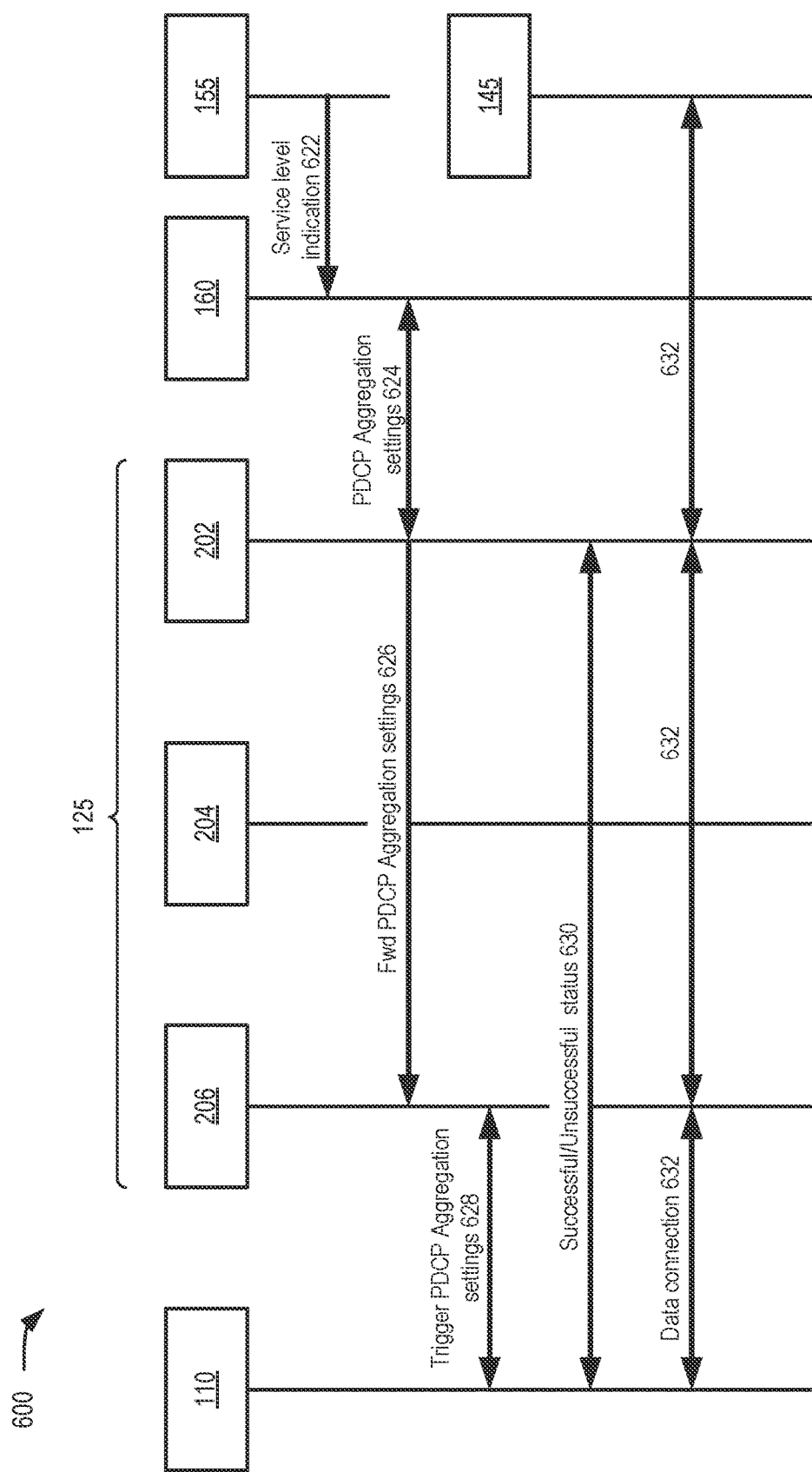

FIGS. 6A and 6B are diagrams illustrating example communications for implementing an intelligent differentiated retransmission scheme in a portion 600 of network environment 100. FIGS. 6A and 6B provide simplified illustrations of communications in network portion 600 and are not intended to reflect every signal or communication exchanged between devices/functions. As shown in FIG. 6A, network portion 600 may include UE device 110, RU 206, DU 204, CU 202, RIC system 160, and MEC device 145.

FIG. 6A illustrates communications for a scenario where application service requirements dictate consistent low latency and HARQ and/or slot aggregation values are correspondingly adjusted. As shown in FIG. 6A, RIC system 160 may receive a service level indication 602 from one of network devices 155. The service level indication may include, for example, a QCI, a network slice ID, or another direct or indirect latency requirement for an application of UE device 110. In the example of FIG. 6A, service level indication 602 may include a consistent low-latency requirement for UE device 110. In another implementation, service level indication may identify a MEC resource (MEC device 145) to service the application of UE device 110.

In response to service level indication 602, RIC system 160 may provide a maximal HARQ and Slot Aggregation values 604 to DU 204 (e.g., the particular DU managing the communication session for UE device 110) via CU 202. As described above in connection with FIG. 4, the HARQ and Slot Aggregation values 604 may include a relatively higher (e.g., higher than typical best-effort settings) allowed maximum number of HARQ transmissions and/or slot aggregation to preclude use of PDCP aggregation. DU 204 may, in turn, communicate HARQ and Slot Aggregation values 606 to RU 206. Additionally, in an implementation, RIC system 160 may also provide a signal (not shown) to CU 202 to disable PDCP aggregation for the particular session with UE device 110.

As indicated at reference 608, RU 206 may trigger use of the HARQ and Slot Aggregation values by UE device 110. As indicated at reference 610, the communication of a successful or unsuccessful data packet transmission between access station 125 and UE device 110 may be implemented using HARQ signaling. UE device 110 may then, as shown in reference 612, establish a connection with MEC device 145 directly through access device 125 (e.g., without using core network 150), using the assigned HARQ and Slot Aggregation values.

FIG. 6B illustrates communications for a scenario where application service requirements do not dictate consistent low latency and PDCP aggregation can provide for higher bandwidth. As shown in FIG. 6B, RIC system 160 may receive a service level indication 622 from one of network devices 155. The service level indication may include, for example, a QCI, a network slice ID, or another direct or indirect latency requirement for an application of UE device 110. In the example of FIG. 6B, service level indication 622 may include a best effort for UE device 110.

In response to service level indication 622, MC system 160 may provide PDCP aggregation settings 624 to CU 202. As described above in connection with FIG. 4, and in contrast with HARQ and Slot Aggregation values 604, PDCP aggregation settings 624 may be utilized to facilitate higher bandwidths available using Dual Connectivity, for example. CU 202 may, in turn, communicate the PDCP aggregation settings 626 to RU 206 (e.g., an RU acting as anchor for the current communication session).

As indicated at reference 628, RU 206 may trigger use of PDCP aggregation settings 624 by UE device 110. As indicated at reference 630, the communication of a successful or unsuccessful transmission between access station 125 and UE device 110 may be implemented using PDCP signaling. UE device 110 may then, as shown in reference 632, establish a connection with MEC device 145 directly through access device 125, using the selected PDCP aggregation settings.

Figure 7:
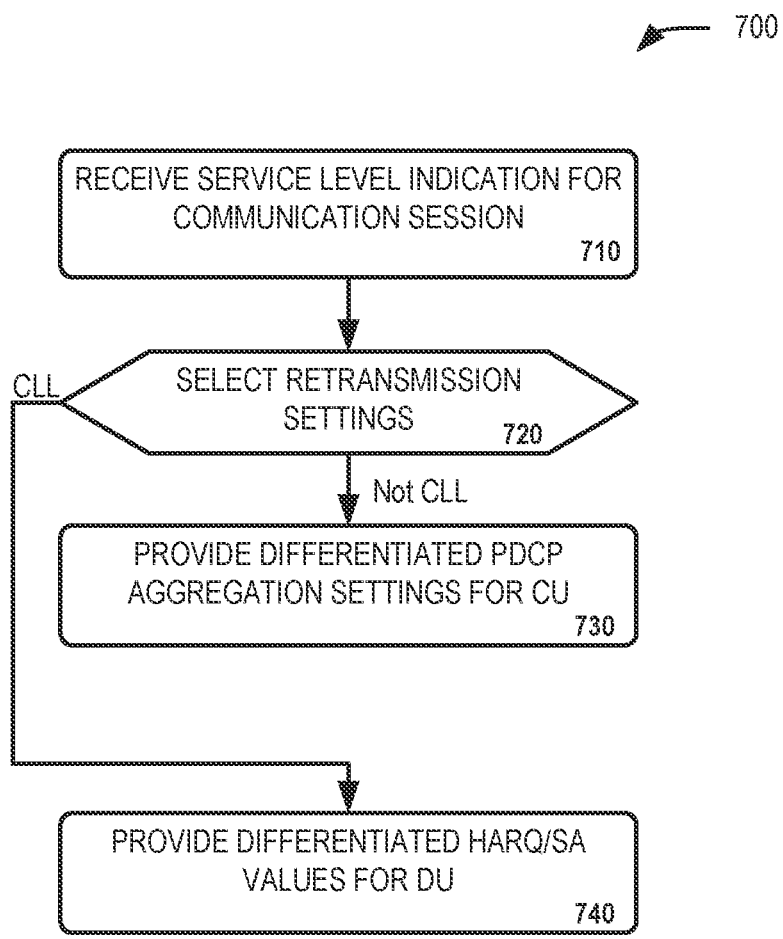
FIG. 7 is a flow diagram illustrating a process for initiating intelligent differentiated retransmission, according to an implementation.

FIG. 7 is a flow diagram illustrating an exemplary process 700 for initiating intelligent differentiated retransmission, according to an implementation described herein. In one implementation, process 700 may be implemented by RIC system 160. In another implementation, process 700 may be implemented by RIC system 160 in conjunction with one or more other devices in network environment 100.

Process 700 may include receiving a service level indication for a communication session (block 710), and selecting retransmission settings for the communication session (block 720). For example, RIC system 160 may receive a slice ID, QCI, user ID, or another indicator that corresponds to a required consistent latency for a requested communication session. For example, an application on UE device 110 may be configured for premium level of service requiring consistent low latency, with a round-trip delay time (RTT) of less than 30 milliseconds (among other parameters). In contrast, a service level for a different application may require a less-stringent consistent RTT of up to 100 milliseconds or more. Access station controller 454 of MC system 160, for example, may refer to retransmit settings database 456 to select, based on the service level indication, among different HARQ values, slot aggregation settings, and/or PDCP aggregation settings to meet latency and bandwidth requirements the communication session. Retransmit settings database 456 may include historical data for a particular location (e.g., which may correspond to a particular RU 206 or DU 204). Access station controller 454 may apply latency/bandwidth requirements, the current UE device location, and the frequency band used by the UE device to select an appropriate retransmission setting for UE device 110.

If consistent low latency is not required for the communication session (block 720-Not CLL), process 700 may include providing differentiated PDCP aggregation settings for a CU (block 730). For example, for applications where consistent low latency is not critical, RIC system 160 (access station controller 454) may provide the selected retransmission settings for PDCP aggregation to PDCP layer 304 of CU 202.

If consistent low latency is required for the communication session (block 720-CLL), process 700 may include providing differentiated HARQ and/or Slot Aggregation values for a DU (block 740). For example, for applications where consistent low latency is required, RIC system 160 (access station controller 454) may provide the selected retransmission settings for maximal HARQ values and slot aggregation settings to DU 204.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 7, and message/operation flows with respect to FIGS. 6A and 6B, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  determining, by a network device, whether consistent low latency is required for a communication session requested by a user equipment (UE) device;
  selecting from a group of retransmission settings, based on the determining, a retransmission setting for the communication session, wherein the group of retransmission settings includes slot aggregation instructions for a physical layer; and
  sending, by the network device and to an access station of a radio access network (RAN), the retransmission setting with the slot aggregation instructions when consistent low latency is required for the communication session.

2. The method of claim 1, further comprising:
  receiving, from a device in a core network, a service level indication; and
  identifying a multi-access edge compute (MEC) resource for the communication session, wherein the selecting is based on the service level indication and a capacity of the MEC resource.

3. The method of claim 1, wherein sending the retransmission setting further includes sending the slot aggregation instructions to a distributed unit (DU) of the access station.

4. The method of claim 1, further comprising:
  sending, by the network device and to the access station, the retransmission setting with Packet Data Convergence Protocol (PDCP) instructions for a PDCP layer when consistent low latency is not required for the communication session.

5. The method of claim 4, wherein sending the retransmission setting with PDCP instructions further includes sending the PDCP instructions to a control unit (CU) of the access station.

6. The method of claim 1, wherein selecting the retransmission setting includes:
  selecting the retransmission setting based on a frequency band for the communication session.

7. The method of claim 1, wherein selecting the retransmission setting includes:
  selecting the retransmission setting based on historical data for a location of the UE device.

8. The method of claim 1, wherein the network device includes a RAN intelligent controller.

9. The method of claim 1, further comprising:
  receiving, from a device in a core network, a service level indication, wherein the selecting is based on the service level indication.

10. A network device, comprising:
  one or more processors to:
    determine whether consistent low latency is required for a communication session requested by a user equipment (UE) device;
    select from a group of retransmission settings, based on the determining, a retransmission setting for the communication session, wherein the group of retransmission settings includes slot aggregation instructions for a physical layer; and
    send, to an access station of a radio access network (RAN), the retransmission setting with the slot aggregation instructions when consistent low latency is required for the communication session.

11. The network device of claim 10, wherein the network device includes a RAN intelligent controller.

12. The network device of claim 10, wherein, when selecting the retransmission setting, the one or more processors are further to:
  select the retransmission setting based on historical data for a location of the UE device.

13. The network device of claim 10, wherein, when sending the retransmission setting, the one or more processors are further to:
send the slot aggregation instructions to a distributed unit (DU) of the access station.

14. The network device of claim 10, wherein the one or more processors are further to:
send, to the access station, the retransmission setting with Packet Data Convergence Protocol (PDCP) instructions for a PDCP layer when consistent low latency is not required for the communication session.

15. The network device of claim 14, wherein, when sending the retransmission setting with PDCP instructions, the one or more processors are further to:
send the PDCP instructions to a control unit (CU) of the access station.

16. The network device of claim 10, wherein the one or more processors are further configured to:
receive, from a device in a core network, a service level indication; and
identify a multi-access edge compute (MEC) resource for the communication session, wherein the selecting is based on the service level indication and a capacity of the MEC resource.

17. A non-transitory computer-readable medium containing instructions executable by at least one processor, the non-transitory computer-readable medium comprising one or more instructions to cause the at least one processor to:
determine whether consistent low latency is required for a communication session requested by a user equipment (UE) device;
select from a group of retransmission settings, based on the determining, a retransmission setting for the communication session, wherein the group of retransmission settings includes slot aggregation instructions for a physical layer; and
send, to an access station of a radio access network (RAN), the retransmission setting with the slot aggregation instructions when consistent low latency is required for the communication session.

18. The non-transitory computer-readable medium of claim 17, wherein, the one or more instructions to send the retransmission setting include instructions to:
send the slot aggregation instructions to a distributed unit (DU) of the access station.

19. The non-transitory computer-readable medium of claim 17, wherein the one or more instructions further cause the at least one processor to:
identify a multi-access edge compute (MEC) resource for the communication session based on a service level indication and a capacity of the MEC resource.

20. The non-transitory computer-readable medium of claim 17, wherein the one or more instructions further cause the at least one processor to:
send, to the access station, the retransmission setting with Packet Data Convergence Protocol (PDCP) instructions for a PDCP layer when consistent low latency is not required for the communication session.

* * * * *